(12) United States Patent
Farrell

(10) Patent No.: US 8,025,805 B2
(45) Date of Patent: Sep. 27, 2011

(54) DEVICE FOR REDUCING BITTERNESS AND ASTRINGENCY IN BEVERAGES CONTAINING POLYPHENOLS AND TANNINS

(75) Inventor: Patrick L. Farrell, Huntington Beach, CA (US)

(73) Assignee: Inventive Technologies, Inc., Westminster, CA (US)

( * ) Notice: Subject to any disclaimer, the term of this patent is extended or adjusted under 35 U.S.C. 154(b) by 303 days.

(21) Appl. No.: 12/485,249

(22) Filed: Jun. 16, 2009

(65) Prior Publication Data

US 2009/0250131 A1    Oct. 8, 2009

Related U.S. Application Data

(63) Continuation-in-part of application No. 11/407,613, filed on Apr. 20, 2006, now Pat. No. 7,622,039, which is a continuation-in-part of application No. 10/893,204, filed on Jul. 16, 2004, now Pat. No. 7,300,580.

(51) Int. Cl.
*C02F 1/48* (2006.01)
*C12H 1/00* (2006.01)

(52) U.S. Cl. .......... 210/695; 210/222; 220/230; 99/275; 99/277.1

(58) Field of Classification Search ............... 210/222, 210/695; 220/230; 99/275, 277.1
See application file for complete search history.

(56) References Cited

U.S. PATENT DOCUMENTS 3,345,594 A * 10/1967 Vermeiren .............. 210/222
7,300,580 B2 * 11/2007 Lindsey et al. ............ 210/222
7,622,039 B2 * 11/2009 Farrell et al. ............ 210/222

* cited by examiner

*Primary Examiner* — David A Reifsnyder
(74) *Attorney, Agent, or Firm* — Walter A. Hackler

(57) ABSTRACT

A method of treating an orally ingestible item having an original taste to be enhanced or reduced without imparting bitterness to the item, includes exposing the item to a magnetic field and oxygen.

6 Claims, 5 Drawing Sheets

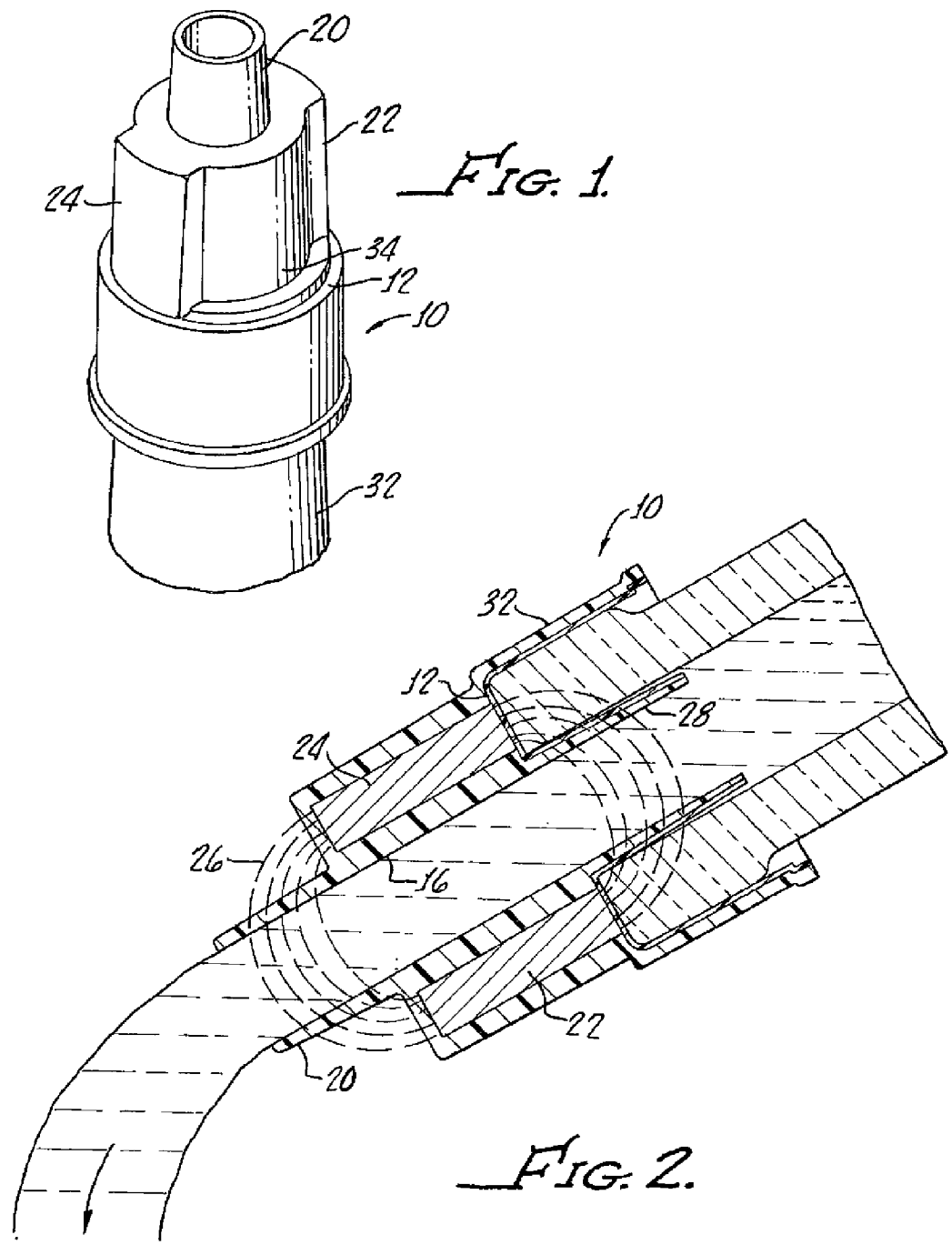

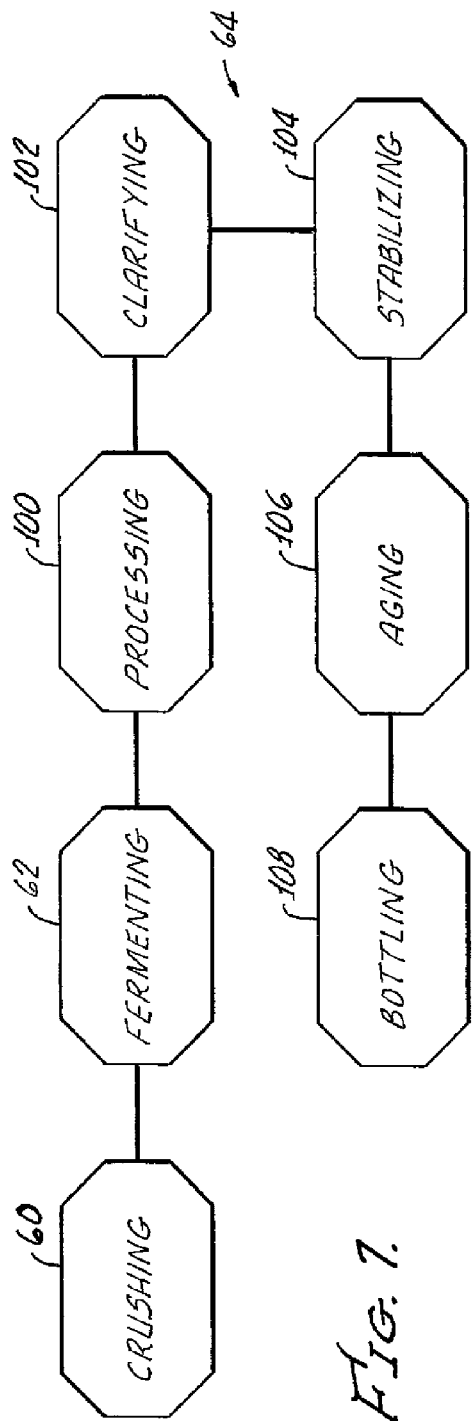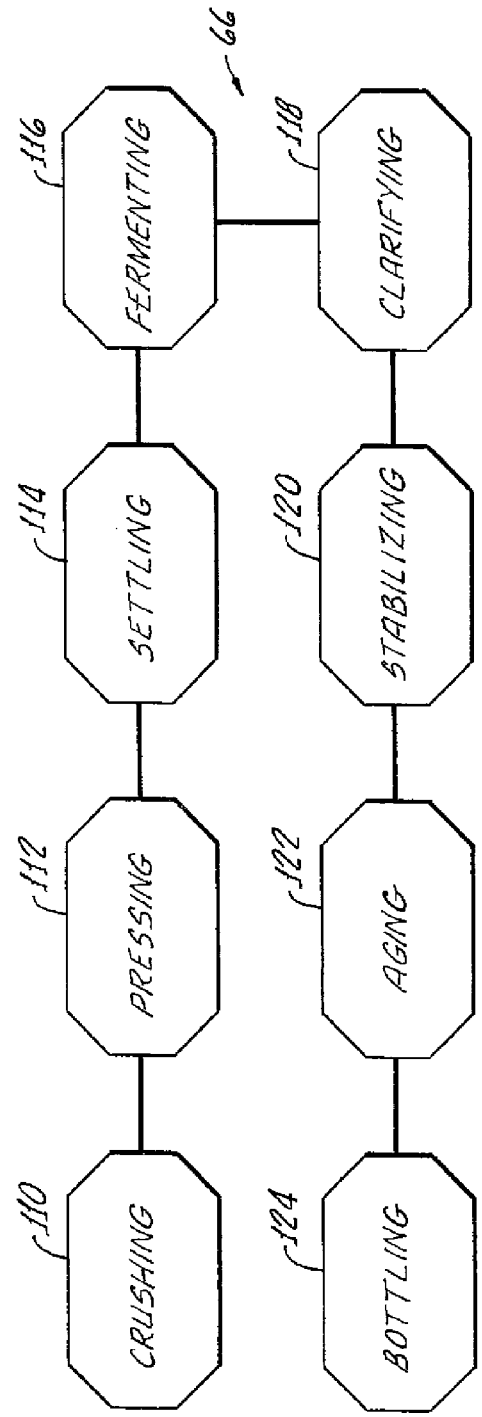

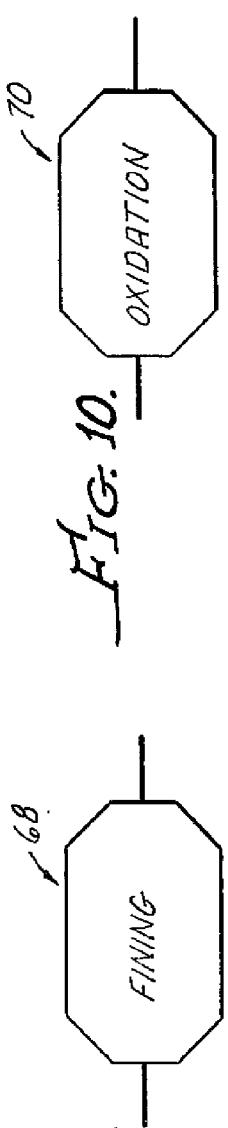
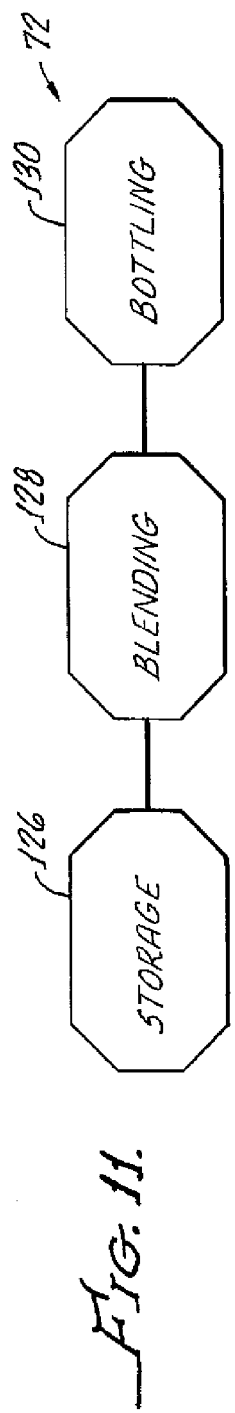
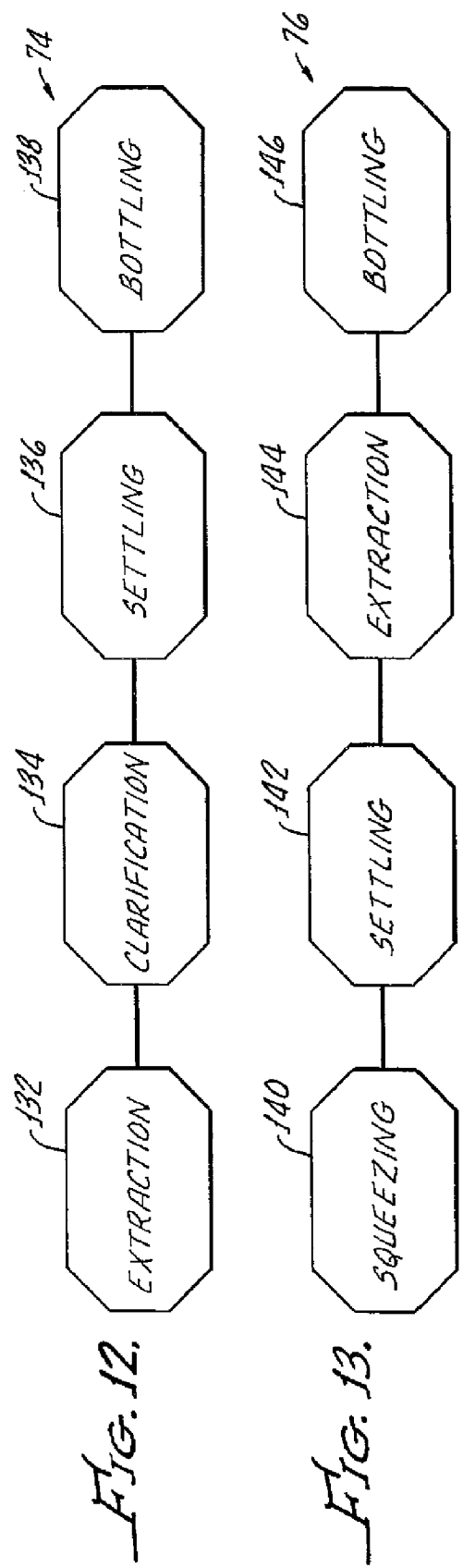

DEVICE FOR REDUCING BITTERNESS AND ASTRINGENCY IN BEVERAGES CONTAINING POLYPHENOLS AND TANNINS

The present application is a continuation-in-part of U.S. Ser. No. 11/407,613 filed Apr. 20, 2006, now U.S. Pat. No. 7,662,039 B2, which is a continuation-in-part of U.S. Ser. No. 10/893,204 filed Jul. 16, 2004, now U.S. Pat. No. 7,300,580.

The present invention generally relates to apparatus and methods for improving the organolaptic properties of beverages including bottled and tap water and is more particularly directed to apparatus and method for exposing beverages and potable water to a magnetic field. With regard to alcoholic beverages, the present invention reduces the perception of tannins and acid. Such alcoholic beverages include wine, brandies, sherries, ports, cognac, spirits, beer, and any other alcoholic beverage. With regard to potable water, the perception of chlorine is reduced and the water tastes better.

One embodiment of the present invention provides for a pourer for enabling selective magnetic treatment of beverages including potable water which is convenient, simple to use, and does not require extensive equipment or the treatment of whole bottles of beverage, or water, or tap water. The pourer in accordance with the present invention is simple in design and the effects are noted immediately as water is exposed to both a magnetic field and to oxygen.

The present invention further is related to the production of beverages and other orally ingestible items. One embodiment is particularly directed to a magnetic nozzle and coupling device, which provides an improvement in facilities requiring transfer of a beverage during the production thereof. Such beverages include wine, coffee, tea, fruit juices, vegetable juice, some beans, spirits, and chocolate. In another embodiment the taste of orally ingestible items such as, for example, chocolate and chewing gum is enhanced.

In the production of these items, polyphenol, including tannins, and flavonoids are produced, which, in the case of beverages, are thereafter extracted in a number of different procedures including, for example, maturation in oak.

The present apparatus is effective in reducing the bitterness and astringency caused by such treatment chemicals and the treatments for their removal.

In order to enhance the flavor, for example, to provide a refreshing flavor, menthol or menthol-containing essential oil, such as Japanese mint oil, and peppermint essential oil may be added to chewing gum, beverages, or chocolate. However, the addition of such menthol or menthol-containing essential oil impact a bitter taste.

A method in accordance with the present invention induces chemical changes with a strong magnetic field particularly in the presence of oxygen so that the bitterness and astringency are reduced and the beverage or food substance or other orally ingestible item becomes richer and more flavorful. It is theorized that the magnetic field acts upon the charged polyphenols to induce polymerization, particularly in the presence of oxygen. Inasmuch as these changes can take place very rapidly, only a brief exposure to a magnetic field and oxygen is required.

The production of various beverages obviously may be effected through various processing stations, which vary in sequence and number depending upon the beverage being produced.

Even the type of wine necessitates a different sequence of processing stations. For example, high quality red wine grapes have a colorless juice and all of the red color is in the grape skins. Consequently, winemakers must leave the juice in contact with the skins for a period of time to extract the color.

Thus, red wine is made by crushing the grapes and then fermenting the juice, the pulp, and the skins, and the seeds together for variable periods of time. After this period of skin contact, or maceration, a wine press is used to separate the liquid from the solid materials.

On the other hand, white wine is made by a completely different process. First, the grapes are crushed and then usually pressed to immediately separate the juice from the solids. After pressing, the skins, stems, and seeds are discarded and the juice is cooled at a low temperature. The cold juice is then allowed to settle for several hours and the clear juice is decanted off the residue before it is fermented. White wine, therefore, is usually made by fermenting clarified juice. Sometimes, after crushing, the must is cooled and held in contact with the skins and seeds for a number of hours. The must is then pressed and fermentation begun.

In addition, fining is a process whereby positive or negatively charged substances (clay, synthetic chemicals, proteins) are added to the wine in order to bind the oppositely charged compounds (tannins and proteins), which then precipitate out of the solution.

Such fining materials are an expense in the wine making process. In addition, labor cost associated therewith increases the cost of the end product. Also, such fining processes can have negative impact upon the flavor of the wine.

Further, process stations include optional "micro-oxidation" in which small bubbles of oxygen are slowly added to red wine tanks so as to cause polymerization of the tannins. Even though such "micro" oxidations involves small amounts of oxygen, wines so treated can suffer from "oxidation". A process which could stimulate tannin polymerization, while requiring less oxygen exposure, could represent an improvement in the winemaking process. Alternatively, a process, such as magnetic exposure of the wine during "micro-oxidation", could lead to greater efficacy of the process in reducing either astringency or greenness of the wine, or other polyphenol containing beverage.

The present invention is directed to an nozzle and coupling device for the production of beverages, which may be utilized at any time a beverage is transferred from one process station to another.

SUMMARY OF THE INVENTION

A pourer in accordance with one embodiment of the present invention for improving organoleptic properties of beverage, or other ingestible items, generally includes a base and a tubular member extending longitudinally through the base along with a spout extending outwardly from the tubular member.

At least two magnets are disposed longitudinally along the tubular member for exposing the water to a magnetic field as the beverage passes through the tubular member and spout. It should be appreciated that the magnetic field is concentrated into the beverage passing through the tubular member because the tubular member may have a lumen therethrough of (for example) ½ inch or less. Accordingly, the volume of water is not of the size requiring either very large magnets.

The pourer may include a stopper extending from the base for insertion into a bottle mouth or water tap and a skirt may be provided and extending from the base for surrounding the stopper and the bottle mouth or tap.

To further enhance or change the organoleptic properties of the water, rapid exposure to oxygen in the air occurs as water is poured. Preferably, an air intake may be provided including an opening disposed transverse to the tubular member for enabling air to be drawn into the water as it passed through the tubular member. Thus, the beverage may be simultaneously treated with a magnetic field and aerated.

Any number of magnets may be utilized, however, such magnets should be disposed for enhancing the magnetic field therebetween. Accordingly, two magnets may be disposed 180° degrees from one another around the tubular member.

In accordance with another embodiment of the present invention useful in a facility requiring transfer of a beverage during production thereof, the present invention provides an improvement which includes a nozzle or a coupling apparatus including a tubular member for passing bulk beverage therethrough and having an outlet and inlet. Alternatively, apparatus in accordance with the present invention may be affixed to existing equipment, such as a "micro-oxidation" device for use during the maturation of the beverage.

A magnetic field generator, either electromagnetic or permanent magnets, (hereinafter "magnets") is associated with the coupling apparatus and exposes the beverage to the magnetic field as the beverage passes through coupling. The magnets are disposed inside the tubular member to establish a venturi therein.

In accordance with an embodiment of the present invention, the beverage is red wine and the transfer occurs between at least two production stations selected from a group of stations consisting of crushing, fermenting, processing, clarifying, stabilizing, aging, and bottling stations with the coupling apparatus being disposed between the two selected production stations. If more than two production stations are selected multiple coupling apparatus in accordance with the present invention may be employed.

In another embodiment in which the facility produces a white wine and the transfer occurs between two production stations which are selected from a group consisting of crushing, pressing, settling, fermenting, clarifying, stabilizing, aging, and bottling, the coupling apparatus is disposed between the two selected production stations.

In addition, the coupling apparatus may further include an air inlet, associated with the venturi, for introducing oxygen to the beverage passing therethrough.

In a facility utilizing a fining station with the fining station precipitating charge compounds, the coupling apparatus in accordance with the present invention may be beneficially disposed between the fining station and another station.

In a facility utilizing an oxidation station, the coupling apparatus in accordance with the present invention may be beneficially disposed between the oxidation channel and another production station, or may be fitted to the oxidation infuser.

In a facility in which the beverage produced is spirits, and the transfer occurs between at least two production stations selected from the group of stations consisting of storage, blending, and bottling stations, the coupling apparatus may be disposed between the two selected production stations. This would be of particular importance whereby wood barrels, wood staves, or wood chips were being utilized during the production process.

In facilities in which production stations are produced coffee and tea and include a group of stations including extraction, clarification, settling and bottling stations, the coupling apparatus in accordance with the present invention may be disposed between any of the two selected production stations or for the treatment of ground coffee beans or tea leaves prior to the extraction by hot water.

In a facility utilized for the production of fruit juice, with transfer occurring between at least two production stations selected from the group of stations consisting of squeezing settling, extraction, and bottling stations, the coupling apparatus in accordance with the present invention may be disposed between the two selected production stations.

In a facility in which chocolate is produced and transfer occurs between at least two production stations selected from a group of stations consisting of extraction, refining, melting, pouring, bottling, and molding stations, the present invention may be disposed between the two selected production stations. Alternatively, cocoa powder may be treated prior to heating.

In a facility in which the beverage is beer and transfer occurs between at least two production stations selected from a group of stations consisting of fermentation, blending, and bottling stations, the coupling apparatus in accordance with the present invention may be disposed between the two selected stations.

In addition, in accordance with the present invention, the magnetic field generator may comprise permanent magnets.

More particularly, a method in accordance with the present invention for improving the effectiveness of fining during the production of a wine includes adding fines to a wine to precipitate charged compounds, exposing the wine with added fines to a magnetic field, and thereafter filtering precipitated charged compounds.

To further enhance or change the organoleptic properties of the water, rapid exposure to oxygen in the air occurs as water is poured. Preferably, an air intake may be provided including an opening disposed transverse to the tubular member for enabling air to be drawn into the water as it passed through the tubular member. Thus, the water may be simultaneously treated with a magnetic field and aerated.

To further enhance or change the organoleptic properties of the water, rapid exposure to oxygen in the air occurs as water is poured. Preferably, an air intake may be provided including an opening disposed transverse to the tubular member for enabling air to be drawn into the water as it passed through the tubular member. Thus, the beverage may be simultaneously treated with a magnetic field and aerated.

Any number of magnets may be utilized, however, such magnets should be disposed for enhancing the magnetic field therebetween. Accordingly, two magnets may be disposed 180° degrees from one another around the tubular member.

BRIEF DESCRIPTION OF THE DRAWINGS

The advantages and features of the present invention will be better understood by the following description when considered in conjunction with the accompanying drawings in which:

FIG. 1 is a perspective view of one embodiment of the present invention generally including a pourer and showing a base, spout, skirt, and magnets for exposing water to a magnetic field;

FIG. 2 is a cross sectional view of the pourer shown in FIG. 1 illustrating the pouring of water through the pourer and exposure to a magnetic field;

FIG. 7 is a schematic drawing of a facility including production stations for the production of red wine in which the present invention may be used to advantage;

FIG. 8 is a schematic drawing of a facility including production stations for the production of white wine in which the present advantage may be used to advantage;

FIG. 9 is a schematic drawing of a fining station which may be utilized in a facility shown in FIGS. 7 and 8;

FIG. 10 is a schematic diagram of an oxidation station which may be utilized in combination with the production facilities shown in FIGS. 7 and 8;

FIG. 11 is a schematic diagram of a facility for the production of spirits;

FIG. 12 is a schematic diagram of a facility for the production of coffee or tea;

FIG. 13 is a schematic diagram of a facility for production of fruit juices;

DETAILED DESCRIPTION

Figure 3:
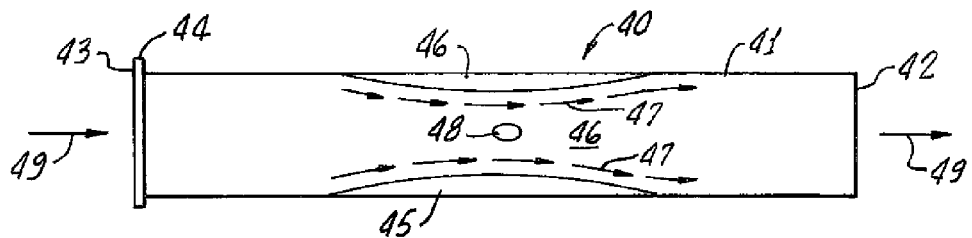
FIG. 3 is a plan view of a nozzle in accordance with the present invention generally showing an open end and a coupling flange, an inlet and outlet along with permanent magnets disposed therein to establish a venturi.

With reference to FIGS. 1-2, there is shown a pourer 10 in accordance with one embodiment of the present invention for improving the taste of water. As is best shown in FIG. 2 the pourer 10 includes a base 12 along with a tubular member 16 extending longitudinally through the base 12. A spout 20 extends outwardly from the tubular member 16 and at least two permanent magnets 22, 24 are disposed longitudinally along the tubular member 16 for exposing water to a magnetic field as the water passes through the tubular member 16 and spout 20 the magnetic field being represented by lines 26. The longitudinal placement enhances the efficiency of coupling the magnetic field with the beverage passing through the tubular member 16. The permanent magnets 22, 24 may be of any suitable type formed from, for example, iron, steel, or rare earth, such as neodymium, atrontium, and alnico, etc.

More particularly, the pourer 10 includes a stopper 18 extending from the base 12 for insertion into a bottle mouth, or tap, 30. The stopper 28 is sized and tapered for sealably engaging the bottle mouth, or tap, 30. In addition, a skirt 32 may be provided for surrounding the stopper 28 and the bottle mouth, or tap, 30 to prevent the entry of any contamination into the bottle mouth, or tap, 30.

The pourer 10 design enables rapid exposure to oxygen upon pouring by way of, an air intake opening 34 which may extend transversely to the tubular member 16 for enabling air to be drawn into the water as it is passed through the tubular member 16.

As shown, preferably the magnets 22, 24 are disposed 180° degrees from one another or on the tubular member and preferably abut a top portion 38 of the skirt 30 in order that the water is immediately exposed to the magnetic field upon entry into the tubular member 16.

Preferably, the base 12, stopper 28, tubular member 16, and spout 20 are integrally formed with the magnets 22, 24 embedded therein. Any suitable plastic may be used for this purpose.

The pourer 10 includes a relatively small aperture in the tubular member 16 (to ensure a strong magnetic field), flanked by two strong magnets 22, 24, and is affixed to the opening of a bottle, flask, or water tap. The water, as it passes the strong magnetic field, causes an alteration in the configuration of the charged particles that impart taste in water. Particularly, the taste of chlorine is reduced. With immediate exposure to air, chemical changes occur to the structure and configuration of chemicals so as to make the water taste softer. Thus, the water is perceived to taste smoother.

With reference to FIG. 3, there is shown a nozzle 40 including a tubular member 41 having an open end 42 and an opposite end 43 with a conventional mounting flange 44. Magnets 45, 46, having an arcuate shape, are disposed within the tubular member 41 and establish a venturi 6 therebetween as indicated by arrows 47. The air inlet opening 48 enables air to be drawn into a beverage as it passes through the nozzle as indicated by arrows 49.

Figure 4:
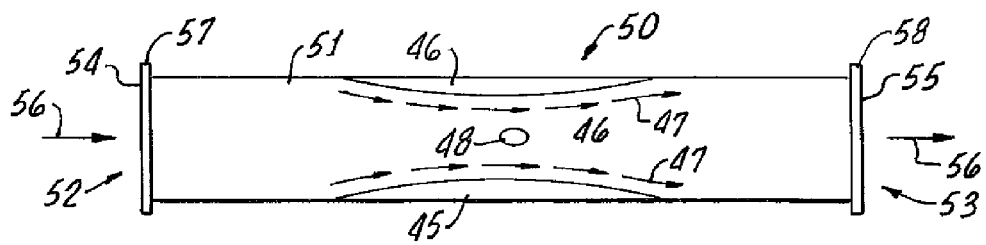
FIG. 4 is a plan view of a coupling in accordance with the present invention having flanges on opposing ends thereof and magnets disposed therein to establish a venturi.

FIG. 4 illustrates a coupling 50, also in accordance with the present invention, having a tubular member 51, an inlet 52, and outlet 53 disposed at opposite ends 54, 55, flow through the coupling being indicated by arrows 56. Common reference numerals in FIGS. 3 and 4 represent identical or substantial equivalent elements as shown and described in conjunction with FIG. 3.

The tubular member 51 includes flanges 57, 58 to enable coupling, with the use of a clamp 59, see FIG. 4 with, for example, an outlet of a crushing status 60 to a fermenting station 62.

The coupling 50 is suitable for use in facilities 64, 66, 68, 70, 72, 74, 76, 78, 80 respectively and diagramed in FIGS. 5-15 as will be hereinafter discussed in greater detail.

The nozzle 40 and coupling 50 may be formed from any suitable material and may be rigid or flexible.

In combination with the red wine production facility 64, shown in FIG. 7, the coupling 50 may be utilized for transfer of beverage between typical production stations including crushing 60, fermenting 62, processing 100, clarifying 102, stabilizing 104, aging 106, and bottling 108. As hereinabove noted, the coupling 50 may be utilized between one or more pairs of the stations 60, 62, 100, 102, 104, 106, 108.

For a white wine facility 66, as shown in FIG. 8, the coupling 50 may be utilized between any two stations including the crushing station 110, pressing station 112, settling station 114, fermenting station 116, clarifying station 118, stabilizing station 120, aging station 122, and bottling station 124.

Other stations may be provided in any of the facilities 64-80 and if utilized are to be considered within the scope of the present invention.

For example, fining station 68 shown in FIG. 9 or the oxidation station 70 shown in FIG. 10 may be used in combination with the red wine facility 64 and the white wine facility 66.

Figure 5:
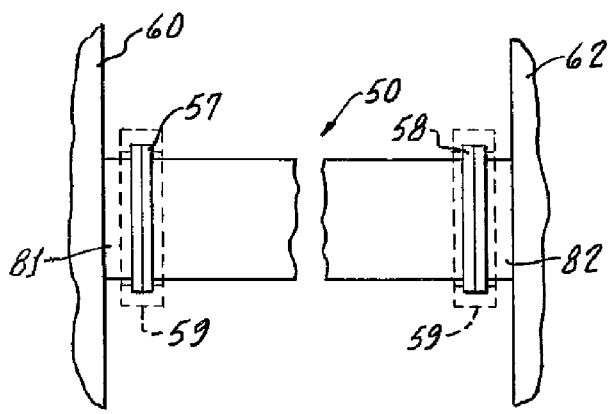
FIG. 5 illustrates a union of the coupling shown in FIG. 4 between production stages.
Figure 6:
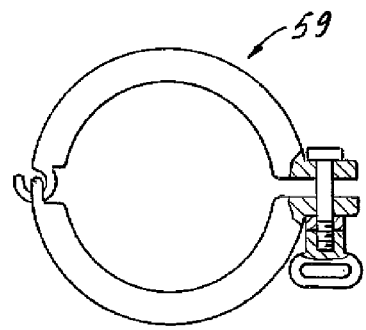
FIG. 6 is a plan view of a clamp facilitating the union between the nozzle or the coupling and a production station.

With reference to FIG. 11, there is illustrated a facility 72 for the production of spirits which include a storage station 126, a blending station 128, and a bottling station 130, among others not shown, the coupling 50 being utilized between any two stations as earlier illustrated in FIG. 5.

With reference to FIG. 12, there is shown a coffee and tea producing facility 74 which includes an extraction station 132, a clarification station 134, a settling station 136, and a bottling station 138, and perhaps others not shown, the coupling 10, 14 being disposed between any two stations as earlier illustrated in FIG. 5.

FIG. 13 illustrates a facility 76 for the production of fruit juice and vegetable juice, which includes a squeezing station 140, a settling station 142, an extraction station 144, and a bottling station 146, the coupling 10, 14 being disposed between any two stations as earlier illustrated.

Figure 14:
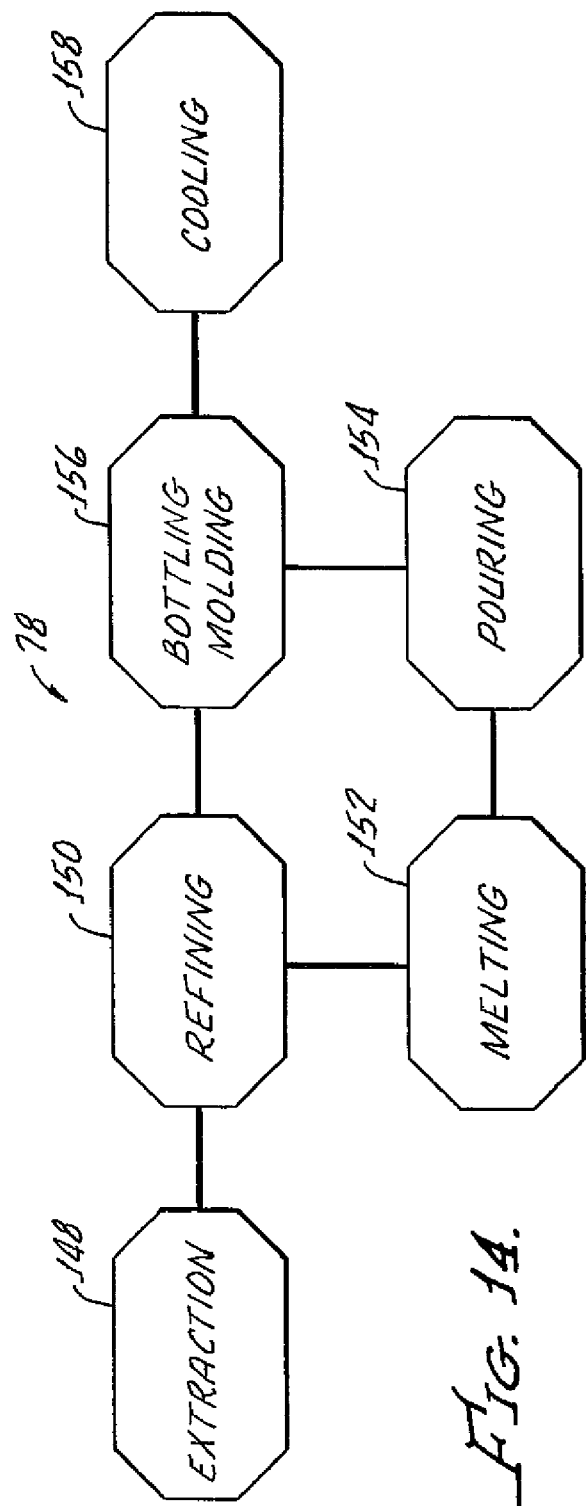
FIG. 14 is a schematic diagram of a facility including stations for the production of chocolate.

FIG. 14 is a diagram of a chocolate production facility 34, which may inoclude an extraction station 148, a refining station 150, a melting station 152, a pouring station 154, a bottling station 15G, and a cooling station 158, the coupling 10, 14 being disposed between any two stations as earlier illustrated in FIG. 5.

With continued referenced to FIG. 14, after cooling, the chocolate may be exposed to a magnetic field and utilizing a source of oxygen, the cooled chocolate may be exposed to a combination of the magnetic field and oxygen in order to enhance or reduce an original taste without imparting bitterness to the chocolate. Further, this process, or method is also applicable in the manufacture of chewing gum and the like and if fluid the gum may be exposed to the magnetic field between any production stations or alternatively when set the gum may be exposed to a magnetic field with or without exposure to oxygen in order to enhance or reduce particular flavors of the gum.

Figure 15:
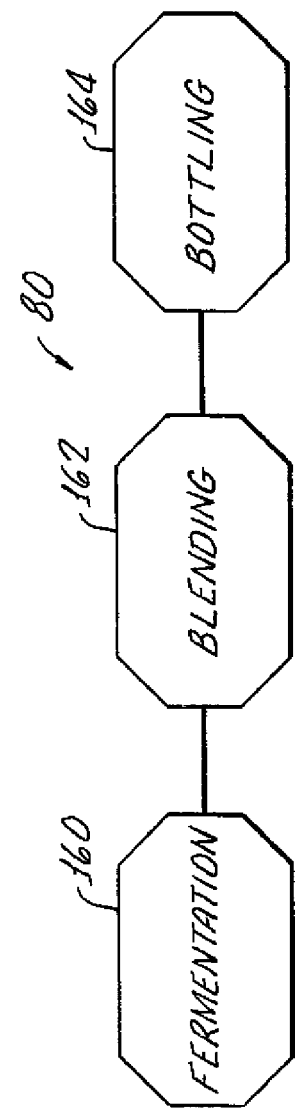
FIG. 15 is a schematic diagram of a facility including production stations for the production of beer.

A beer production facility 80 is illustrated in FIG. 15, which may include a fermentation station 160, a blending station 162, and a bottling station 164 among others not shown but considered to be within the scope of the present invention, the coupling 10, 14 being disposed between any two stations as earlier illustrated in FIG. 5.

Although there has been hereinabove described a specific device for reducing bitterness and astringency in beverage in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A nozzle for improving organoleptic properties of beverages or other orally ingestible items, the nozzle comprising:
    a tubular member having an open end and an opposite end adaptable for coupling to a liquid source;
    at least two magnets disposed longitudinally inside said tubular member for establishing a venturi and for exposing a beverage to a magnetic field as the beverage passes through said tubular member; and
    an air intake opening through said tubular member and adjacent said venturi for enabling air to be drawn into the beverage as it is passes through said nozzle.

2. The nozzle according to claim 1 wherein the two magnets are disposed 180° degrees from one another around the tubular member.

3. The nozzle according to claim 1 wherein the magnets are disposed in a spaced apart relationship with the open end of said tubular member.

4. A coupling for improving organoleptic properties of beverages or other orally ingestible items, the coupling comprising:
    a tubular member having two opposing ends each adopted for coupling to respective inlet and outlet devices;
    at least two magnets disposed longitudinally inside said tubular member for establishing a venturi and for exposing a beverage to a magnetic field as the beverage passes through said tubular member; and
    an air intake opening through said tubular member and adjacent said venturi for enabling air to be drawn into the beverage as it is flowed through said tubular member.

5. The coupling according to claim 4 wherein the two magnets are disposed 180° degrees from one another around the tubular member.

6. The coupling according to claim 4 wherein the magnets are disposed in a spaced apart relationship with an end of said coupling.

* * * * *